United States Patent Office 3,483,650
Patented Dec. 16, 1969

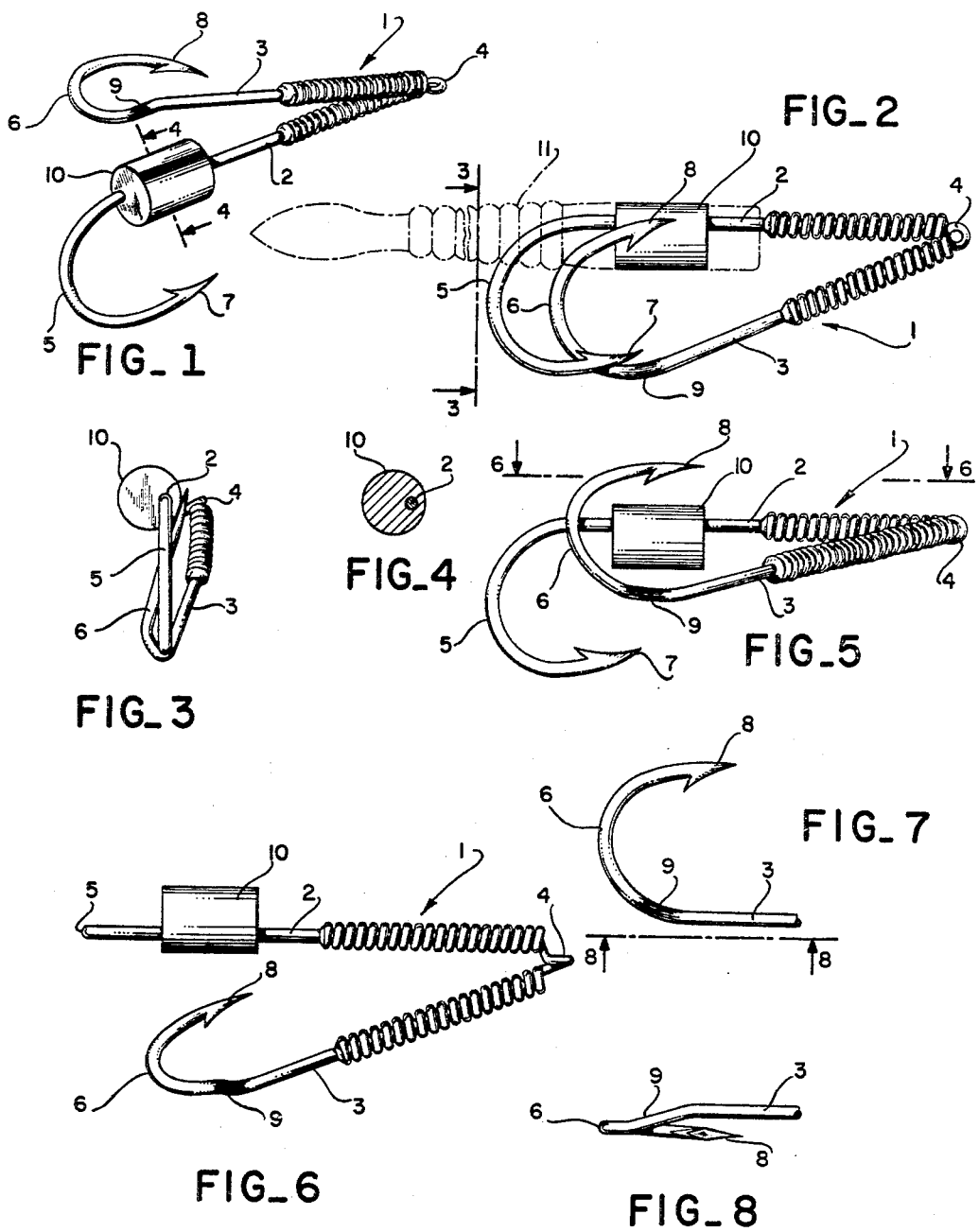

3,483,650
WEEDLESS FISH HOOK WITH VARIABLE RELEASE FORCE ADJUSTMENT
Horace F. Weaver, Rte. 3, Moultrie, Ga. 31768
Filed June 7, 1968, Ser. No. 735,213
Int. Cl. A01k 83/00
U.S. Cl. 43—35      3 Claims

ABSTRACT OF THE DISCLOSURE

A weedless fish hook assembly having a pair of members joined in a divergently biased manner when at least one fish hook is in an open, unprotected position and yet placeable into a closed or protected position in which a release force is necessary to permit the divergent biasing element to move the members of the assembly into the open, unprotected position. The assembly includes a variable release force adjustment camming device mounted on one of the members for physical cooperation with the other member to permit variability of the force necessary to release the hook assembly to an open, unprotected position.

---

This invention relates to a weedless fish hook construction or arrangement wherein the force or pressure necessary to get the hook end into an unguarded or unprotected position can be varied or controlled without modification of the fish hook by deformation or reshaping.

As is known in the prior art, weedless type fish hooks utilize some form of a protective guard in relation to the pointed or barbed end of the fish hook so that the hook end does not get caught or hung up on underwater weeds, rocks, debris, or tree roots, etc. This protective guard is usually spring biased in some manner away from its protective position relative to the hook so as to move away from the hook and thus permit the hook unimpeded functioning once a fish strikes. It has been found that when utilizing a weedless or protective type fish hook as contemplated herein that an ability to vary the force necessary to effect an unshielding or release of weedless protection feature is desired, and especially an arrangement that does not become difficult or cumbersome at a time when the fish hook is in use.

Accordingly, it is an object of this invention to provide a shielded or weedless type fish hook wherein there is provided an arrangement to vary the pressure needed to release the protection of the hook without physical modification of the fish hook assembly by deformation or reshaping thereof.

It is a further object of this invention to provide such a fish hook with a release pressure varying feature in which the release pressure can be varied within a range of pressures without physically modifying the hook assembly by deformation or reshaping.

Another object of this invention is to provide a release pressure varying feature for a fish hook assembly capable of use with both a single and a double hook assembly.

Still a further object of this invention is to provide a release pressure varying feature capable of use on fish hook assemblies incorporating certain artificial lures, live bait, or even bare hooks, and yet regardless of whether a single or double hook assembly is utilized.

Further objects and advantages will become apparent when considering the following specification taken in conjunction with the attached drawings wherein:

FIGURE 1 is a perspective view of one embodiment of a double fish hook arrangemen or assembly of this invention wherein the fish hooks are in unshielded or unprotected or open positions;

FIGURE 2 is a side view of the double hook arrangement or assembly of FIGURE 1 with the fish hooks placed in a shielded or protected or closed position as shown in solid lines, as well as showing in dotted lines how an elongated artificial lure can be mounted on one of the hook shafts to serve as the release pressure varying device of this invention;

FIGURE 3 is a view taken along the line 3—3 of FIGURE 2 and eliminating the artificial lure shown in dotted lines in FIGURE 2;

FIGURE 4 is a view taken along line 4—4 of FIGURE 1;

FIGURE 5 is a view showing the relationship of the two hooks of the assembly of FIGURE 1 when the lowermost hook is parallel to the plane of the drawing surfaces and the hooks are in an unshielded or unprotected or open position;

FIGURE 6 is a view taken along line 6—6 of FIGURE 5;

FIGURE 7 shows the arrangement of the uppermost hook of FIGURE 2 with the shaft of the hook parallel to the plane of the drawing surface; and FIGURE 8 is a view taken along line 8—8 of FIGURE 7.

Generally stated, the invention provides a fish hook arrangement or assembly comprising a pair of elongate, rather rigid wire members connected at one end by a spring so as to place the wire members in a spring-biased divergent relative relationship when the wire members are unrestrained. The free ends of each of the wire members are curved, with the curved end of either or both of the wire members formed to provide a barbed fish hook. On one of the wire members there is rotatively mounted a camming device, the outer surface of which serves as a resting or contact surface for the hook or curved portion end of the other wire member when the hook assembly is placed in a shielded or guarded position. By having the camming device placed on the wire member in an off-center manner, the distance between the wire member the camming device is on and the curved end of the other wire member may be varied; such variation of this distance changing the release pressure of the fish hook assembly from a shielded or protected hook position to an unshielded or open position as will be explained more fully hereinafter. On the wire member other than the one the camming device is mounted there is provided an offset to receive and retain the curved end of the wire member on which the camming device is mounted during that time when the hook assembly is in a shielded or protected position.

Referring more specifically to the drawings, the hook assembly 1 consists of a pair of elongate wire members 2 and 3 joined by any appropriate spring device 4 and serving to retain members 2 and 3 in a biased, divergent relationship when there is no restraint on members 2 and 3 as can be seen best in FIGURES 1, 5, and 6. The free, or unjoined end portions of members 2 and 3 are provided with a bend 5 and 6, respectively, each leading to a pointed or barbed hook tip 7 and 8, respectively.

It is to be understood that the showing of both tips 7 and 8 as being pointed and barbed for fish hook structures is the preferred embodiment for a double fish hook arrangement, and that practice of the present invention can occur by use of only one fish hook, whereby either tip 7 or 8 may be merely a clean or unpointed end of their respective members 2 and 3 should only one hook be desired in the fish hook assembly or arrangement.

Rotatively mounted on the elongate portion of wire member 2 is a camming device 10; camming device 10 being mounted in an off-centered manner on wire member 2 as most clearly seen in FIGURES 1 through 6 and may be of any appropriate resilient elastomeric or plastic material that is capable of being retained in a rotation position on wire member 2 once placed or moved into a position by manual rotative manipulation by the user, e.g. the material being rubber, nylon, Teflon, etc. Also, while camming device 10 is shown with relatively flat, parallel ends, it is to be understood that any desired shape, such as one with rounded ends or even a complete ball, may be used so long as it is mounted eccentrically or off-center on wire member 2. In fact, it is possible to utilize an elongate, pliable rubber-type artificial lure, such as an artificial worm, as the camming device 11, shown in FIGURE 2 in dotted lines, in lieu of the merely functional type of camming device 10 shown.

The wire member 3 has an offset 9 located between the elongate portion of wire member 3 and bend 6 as can be best seen in FIGURES 1, 2 and 5 through 8.

When the hook assembly is in its open, or unshielded, position as best clearly seen in FIGURES 1, 5 and 6, the spring device 4 places the wire members 2 and 3, with their associated bends 5 and 6, and ends 7 and 8, in a divergent relationship. To place the hook assembly 1 into a hook shielded or protected position, the user merely places the hook or tip 8 down into contact with the outer surface of camming device 10 and thereafter move wire member 3 relative to wire member 2 so that upon manual release of wire member 3, the hook tip 7 will rest within the area of offset 9 and the hook assembly 1 will be retained in this position as shown in FIGURES 2 and 3 until a fish strikes by closing its mouth over assembly 1 to move wire members 2 and 3 toward each other as viewed in FIGURE 2. This action by the fish releases tip 7 from offset 9 and the tips 7 and 8 separate from each other by the bias force of spring 4 to relative positions shown in FIGURES 1, 5 and 6. Through the manual manipulation or rotation of camming device 10 on wire member 2, the force necessary to effect release of tips 7 and 8 may be varied by the user in a most easy and simplified manner so as to obtain the best release pressure for the type of fish being sought and the conditions of the waters being fished.

Should the release pressure desired be outside the pressure variation range offered by rotation of camming device 10 on wire member 2, the entire pressure variation range can in turn be adjusted by increasing or decreasing the amount of joggle of offset 9 by deformation or bending of the wire member 3 whereupon there is presented a new range of release pressure variation controlled by the simple expedient of rotation of camming device 10 about wire member 2.

While particular embodiments of the invention have been illustrated and described, it will be obvious to those skilled in the art that various changes and modifications may be made without departing from the invention.

What is claimed is:

1. A fish hook assembly comprising a first and a second elongate member; spring means interconnecting one end of each said first and second members in an approximate coextensive and divergently biased manner when said members are relatively unrestrained; each of the other end portions of said first and second members formed to provide a hook type bend ceasing at the tip end of said first and second members; said bends being in approximate opposite directions relative to each other; at least one of said tip ends formed into a pointed fish hook tip; a lateral joggle type offset located in said first member intermediate the elongate portion and the bend portion; and a camming device means rotatively mounted on the elongate portion of said second member, said camming means mounted in an eccentric off-center manner and at a position to serve as a restraint contact for the tip end of the first member when the tip end of the second member is placed in a restraint contact with the first member in the offset therein, the eccentric off-center mounting of the camming means providing a variation in the release force of the fish hook assembly to place the first and second members in a divergently biased relative position by manual rotative adjustment of said camming means.

2. A fish hook assembly as defined in claim 1 wherein said camming means comprises an elongate artificial lure trailing longitudinally beyond the bend portion of said second member.

3. A fish hook assembly as defined in claim 1 wherein both said tip ends of said first and second members are formed into a pointed fish hook tip.

References Cited

UNITED STATES PATENTS

| | | | |
|---|---|---|---|
| 650,277 | 5/1900 | Rossner | 43—36 |
| 814,624 | 3/1906 | Robinson | 43—36 |
| 1,056,397 | 3/1913 | Bonnell | 43—36 |
| 1,262,039 | 4/1918 | Graves | 43—35 |
| 1,346,674 | 7/1920 | Pickup | 43—35 |
| 2,004,316 | 6/1935 | Foote | 43—36 |
| 2,596,564 | 5/1952 | Kautenberg | 43—35 |

SAMUEL KOREN, Primary Examiner

DANIEL J. LEACH, Assistant Examiner

U.S. Cl. X.R.

43—36, 42.24, 42.37